Nov. 11, 1941. W. BURROWS Re. 21,939
TUBULAR WIRE STRANDING MACHINE
Original Filed Feb. 16, 1940
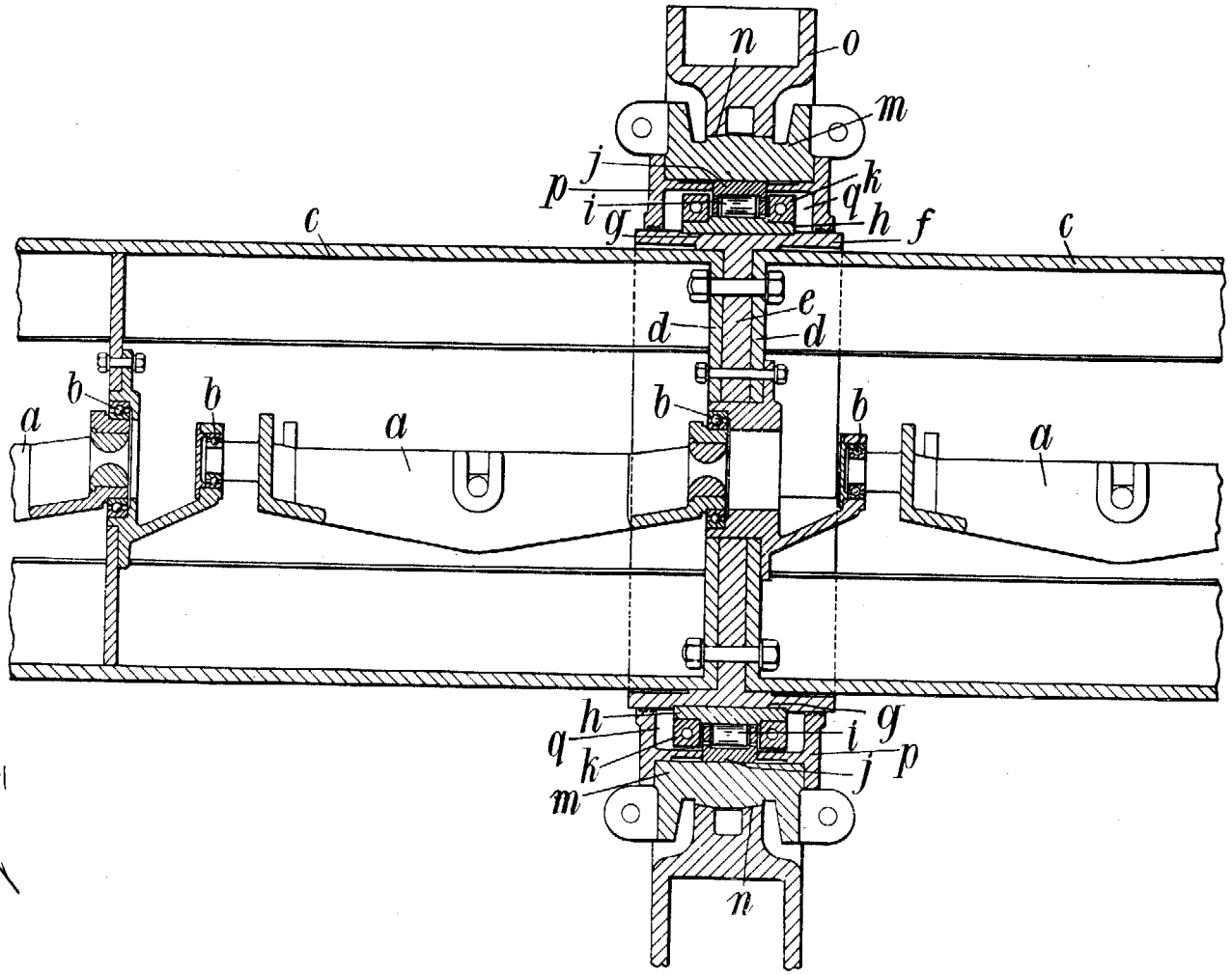
Inventor,
W. Burrows
By: Glascock Downing & Seebold
Attys.

Reissued Nov. 11, 1941 Re. 21,939

UNITED STATES PATENT OFFICE 21,939

TUBULAR WIRE STRANDING MACHINE

William Burrows, Warrington, England, assignor to Hanson & Edwards Limited, Warrington, England, a company of Great Britain Original No. 2,218,278, dated October 15, 1940, Serial No. 319,345, February 16, 1940. Application for reissue July 3, 1941, Serial No. 400,996. In Great Britain January 7, 1939

5 Claims. (Cl. 57—59)

This invention relates to wire stranding machines of the high speed tubular type in which the wire reels are mounted within a revolving tube built up from a plurality of sections, and has for its object to provide improved supporting means for the said tube which can be readily and conveniently assembled.

The form of the invention shown comprises a roller bearing assembly for the revolving tube of a wire stranding machine of the type specified, including a ring member which surrounds the revolving tube and is secured thereto.

The invention, in the illustrated embodiment, further comprises a wire stranding machine of the type specified having a bearing assembly comprising a ring member carrying the inner race of a roller bearing and having an internal rib coming between or adapted to come between the ends of adjacent sections of the revolving tube and secured or adapted to be secured thereto, and an outer ring carrying the outer race of the said roller bearing and secured or adapted to be secured in the machine frame or housing to support the revolving tube.

Preferably there are side members upon said outer or inner ring which provide an oil or grease retaining space between themselves, the outer ring and the said roller bearing.

The rollers are preferably capable of axial movement upon the inner or outer race to allow for the expansion or contraction of the revolving tube.

In the case of tubular wire stranding machines in which the tube sections are of the plain or butt ended instead of flanged ended kind, the ends of the tube sections may be secured to the parts of the ring member into which they may fit by countersunk set screws or by bolts, instead of being secured to an internal rib upon such ring.

It is to be understood that the tube is of uniform diameter throughout, the ring member having an internal diameter corresponding to the full external diameter of the tube.

The accompanying explanatory drawing is a longitudinal sectional elevation through part of a wire stranding machine constructed in accordance with one form of the present invention.

The wire reels, not shown, are mounted in a series of cradles *a* carried on ball bearings *b* in a rotary tube *c*.

The tube *c* is of uniform diameter throughout and is made in sections, the adjacent ends of which, as shown, are inwardly flanged, as at *d*, and bolted to an inwardly extending rib *e* on the ring member *f* (which, in the form shown, fits over the ends of the tube sections) and to one another.

The ring member *f* has a recess *g* around its outer peripheral face in which is received the split inner race *h* of a roller bearing. The rollers *i* of this bearing are received in a recess in an outer race *j* which is retained in position by cage rings *k* mounted on the said inner race. The said outer race *j* (which is not split) is supported by a ring *m* having a spherical mounting (at *n*) in the machine frame *o*. The said outer race *k* is held in position by two side members *p* upon the ring *m*, providing between them an oil or grease retaining space *q*. The ends of these side members *p* engage the ring member *f*.

The parts *f*, *h* and *k* have an axial sliding movement relatively to the parts *i*, *j*, *m* and *p* to allow for changes in the length of the tube *c* owing to expansion and contraction thereof, the extent of this sliding movement being limited by engagement of the parts *j* and *k*. The spherical bearing *a* compensates for inaccuracies in the alignment of the tube *c* relatively to the machine frame.

The complete bearing structure, from the tube engaging ring member *f* to the outer ring *m* can be sent out from the makers' factory ready assembled, and when the machine is set up the sections of the tube *c* may be bolted together with the bearing assemblies located between and carried by adjacent sections or mounted upon one of the sections with the ring member *f* secured to the tube. Thus slight distortions in the tube or inaccuracies in its alignment do not disturb the bearing assembly.

What I claim is:

1. In a wire stranding machine of the type specified, a roller bearing assembly comprising a revolving tube of uniform diameter throughout its length formed of separate end connected sections, a ring member having portions surrounding adjacent ends of said sections and secured thereto, and a roller bearing surrounding said ring.

2. In a wire stranding machine of the type specified, a revolving tube of uniform diameter throughout its length, comprising end connected sections, a bearing assembly comprising a ring member adapted to embrace the exterior surfaces of the ends of adjacent sections of the said revolving tube, an internal rib upon said ring adapted to come between the ends of said sections, means to secure said ring to said sections, a roller bearing disposed around said ring, and an outer ring surrounding said roller bearing and adapted to be secured to a fixed support.

3. A stranding machine having a revolving tube of substantially uniform diameter throughout its length formed of tubular sections arranged in axially aligned relation and having their adjacent end portions firmly united to each other, a ring member surrounding the revolving tube adjacent to the connected ends of adjacent sections and secured thereto, said ring having a portion thereof located outwardly radially of the revolving tube serving as a support for an anti-friction bearing, an anti-friction bearing surrounding said ring member, and a supporting frame located outwardly of said bearing for supporting said bearing and revolving tube.

4. A stranding machine structure comprising a revolving member formed of tubular sections having cylindrical central and adjacent end portions of uniform diameter, an annular member connecting the end portions of said sections to each other in the axially aligned relation of the sections, a ring member carried by said revolving member and located outwardly radially thereof serving as a support for an anti-friction bearing, a continuous, annular anti-friction bearing carried by said ring member and surrounding said revolving member, and a continuous, annular supporting frame located outwardly of said bearing for supporting said bearing and revolving member.

5. A stranding machine structure comprising a revolving member formed of tubular sections, an annular member connecting the end portions of said sections to each other in the axially aligned relation of the sections, a ring member carried by said revolving member and located outwardly radially thereof serving as a support for an anti-friction bearing, a continuous, annular anti-friction bearing carried by said ring member and surrounding said revolving member, and a continuous, annular supporting frame located outwardly of said bearing for supporting said bearing and revolving member.

WILLIAM BURROWS.